United States Patent [19]

Pascoe

[11] Patent Number: 5,437,492
[45] Date of Patent: Aug. 1, 1995

[54] MAGNETIC BOOT UMBRELLA

[76] Inventor: Michael Pascoe, 680 Lighthouse Ave., Pacific Grove, Calif. 93950

[21] Appl. No.: 63,236

[22] Filed: May 18, 1993

[51] Int. Cl.$^6$ ............................................. B60P 3/32
[52] U.S. Cl. .................................... 296/166; 296/156
[58] Field of Search ........................ 296/166, 190, 156

[56] References Cited

U.S. PATENT DOCUMENTS

| | | | |
|---|---|---|---|
| 4,294,485 | 10/1981 | Engelhard | 296/166 |
| 4,848,832 | 7/1989 | Starnes | 296/166 |
| 5,280,984 | 1/1994 | Paul et al. | 296/166 X |

Primary Examiner—Joseph D. Pape
Attorney, Agent, or Firm—LaRiviere, Grubman & Payne

[57] ABSTRACT

Method and apparatus for preventing leakage between the cabin of a pickup track and the boot of a camper shell installed thereon, the cabin and boot forming a joint therebetween. A magnetic boot umbrella, in the form of at least one length of magnetically attachable flashing, is attached to a substantially rear surface of the cabin of a pickup truck, and shields the cabin-boot joint. The magnetically attachable flashing comprises a flashing strip, which may be flexible or rigid, in operative combination with a magnet strip. Water or other fluids are precluded from intrusion between the cabin and the magnet strip by the intimate contact afforded therebetween by the flexible and conformable nature of the strip and the tenacity of its attachment to the cabin. A fluid traveling down the rear surface of the cabin is first diverted by the magnet strip over the flashing. The flashing then diverts the fluid over the boot-cabin joint to the body of the boot and thence away.

17 Claims, 3 Drawing Sheets

MAGNETIC BOOT UMBRELLA

TECHNICAL FIELD

The present invention relates generally to a method and apparatus for eliminating the unwanted intrusion of fluids between seal elements. More specifically the present invention teaches a magnetic boot umbrella consisting of a flashing strip which is attached magnetically to the cab of a truck and which prevents the unwanted leakage of water or other fluids between the cab of the pickup truck and the boot of a camper shell installed in the bed of the truck.

BACKGROUND ART

Many camper shells for installation in the bed of a pickup truck are fitted with a window on the front surface of the camper, which window is in substantial alignment with the rear window of the truck. In order to allow communication or access between the cabin of the truck and the bed of the truck, as covered by the camper shell, while preventing the unwanted intrusion of water or other fluids into either the cabin or the camper, a flexible seal or boot is often fitted. These boots are typically substantially tubular structures, having a central aperture and two ends, and an outline which approximates the camper window and/or the truck rear window. One end is typically attached to the outer front surface of the camper, about the camper window. This attachment is generally accomplished by mechanical fasteners or adhesives. Alternatively, the boot may be elastically received into a channel mourned or formed on the front surface of the camper. When the camper is installed in the truck, the camper window is in substantial alignment with the rear window in the truck cabin, and the boot, being compressed against the outer rear surface of the cabin, is designed to seal both the cabin and the camper from the unwanted intrusion of fluids therebetween. Seals of this class are often compressive in nature, but may be either permanently or semi-permanently sealed to the cabin.

In practice, these sealing methodologies are seldom satisfactory. In the case where the seal is compressive in nature, vibration, wear, corrosion, the imperfect elasticity of the boot, and/or surface imperfections on either the boot or the truck cabin generally preclude a fully waterproof seal at the cabin-boot joint. In failing to provide a leak-free connection, seals of this class generally allow leakage between the boot and the cabin, and lead to problems such as corrosion and water damage to the cabin interior or to material stored or carried within the shell, and may lead to degradation of the boot itself or other corrosion effects.

In the case where the seal is made permanent, or nearly so, removal of the camper from the pickup truck is either difficult or impossible to effect without damage to the structure or finish of the truck.

Permanent sealing methodologies include the use of fasteners to fasten the boot to the cabin; the use of adhesive seals or products to adhesively seal the boot to the cabin surface; welding or other mechanical attachment of the camper shell or an extension thereof to the cabin of the truck; and the replacement of the original boot with a custom fitted boot appliance which may or may not be a permanent installation, uniting both structures.

Fasteners include screws, bolts, rivets, snaps, hook-and-loop tape, patent fasteners and the like, and almost invariably inflict some damage to the cabin or the camper.

Current adhesive seals include adhesive tapes, adhesively attachable foam strips, caulking compounds, and other adhesive products. Adhesive seals can provide an adequate seal between the truck cabin and the camper shell but do so by forming a permanent seal which is not optimal for removable camper shells. Furthermore, such adhesive seals typically cause damage to the paint or metal structures of the vehicle.

Welding, soldering, brazing a similar permanent structure between the camper and the cabin creates almost complete permanency therebetween, and obviates the removable feature of such camper shells. Welded structures invariably damage the paint or metal structure of the vehicle itself.

Another solution to the leakage problem previously discussed is by replacing the originally installed boot with a custom-fitted replacement boot or boot assembly which utilizes an alternative sealing methodology. One such custom boot assembly is presented in U.S. Pat. No. 4,294,485 to Engelhard. '485 teaches a "resiliently deformable boot frame shaped to the respective contours of the rear window aperture of the truck cab and front window aperture in the forward wall of the camper." "The opposite ends of the boot frame are adapted for attachment to the cab and camper. One of such ends may include a magnetic stripe which may be magnetically adhered to the cab." Thus, it will be seen that '485 teaches replacing the original boot with a replacement which incorporates a magnetic stripe in order to perfect the cabin-boot seal.

While the magnetic seal taught by '485 may provide a possible means of non-permanently sealing a boot with truck cabin, the teachings of that patent do require that the originally fitted boot be replaced. Replacement of a camper boot, particularly with the substantial structure taught by '485, is a laborious and expensive undertaking.

What is needed is a means of incorporating a magnetic sealing element to perfect the cabin-boot seal without the effort and expense of replacing the entire boot assembly. A possible solution to this problem lies in not replacing the boot, but in flashing the joint between the boot and the cabin.

The use of flashing is well known in the roofing arts. Flashing consists of lengths of material, frequently sheet metal or the like, which are used to cover and protect certain joints and angles in roof systems: e.g.: where a roof comes into contact with a wall or chimney. Flashing, as practiced in the roofing trades, is typically applied by means of nails, staples, or adhesives, and therefore forms a substantially permanent installation.

Covering or shielding the existing boot-cabin joint with magnetically attached flashing would prevent the incursion of fluids between the cabin-boot joint without the use of sealing compounds, mechanical fasteners, adhesives, or welded structures. Such flashing, forming an effective magnetically attachable "umbrella" over the boot, would preclude an unwanted degree of permanence in the installation of a camper shell. Such flashing would not require the replacement of the existing boot, but would perfect the seal created by a boot with the cabin, by diverting water from the cabin-boot joint over the body of the boot, and thence away from the joint.

DISCLOSURE OF INVENTION

The magnetic boot umbrella apparatus of the present invention comprises at least one length of magnetically attachable flashing including a flashing strip attached to, or integrally formed with, a magnet strip, the apparatus for overlaying and covering at least a portion of the joint between the camper shell boot and the cabin of the vehicle. At least one length of this flashing is magnetically attached to the cabin of the pickup truck in such a manner that the magnet strip seals against the cabin, and the flashing strip substantially overlies and covers the cabin-boot joint. In this manner, the present invention diverts water and other fluids from that joint onto the body of the boot, thereby preventing unwanted entry of those fluids into either the cabin or the camper.

The magnetically attachable flashing strip of the present invention may be formed as a composite of several pieces, or may be formed as a substantially integral whole. One or more lengths of the magnetically attachable flashing strip of the present invention may be utilized to provide the requisite degree of leak proof seal augmentation. At least one length of magnetically attachable flashing may be pre-formed to conform with the surface of at least one of the camper and the cabin. The magnetically attachable flashing of the present invention is sufficiently wide to cover the exposed cabin-boot joint and of sufficient length to shield the exposed length of the cabin-boot seal.

As an alternative to the separate flashing embodiment previously discussed, the magnetically attachable flashing strip of the present invention may be incorporated into the boot of a camper. As in the previously discussed embodiment, this version of the present invention, being magnetically attachable to the body of a pickup cabin, also perfects the cabin-boot joint by magnetically sealing against the cabin.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawing.

Figure 1:
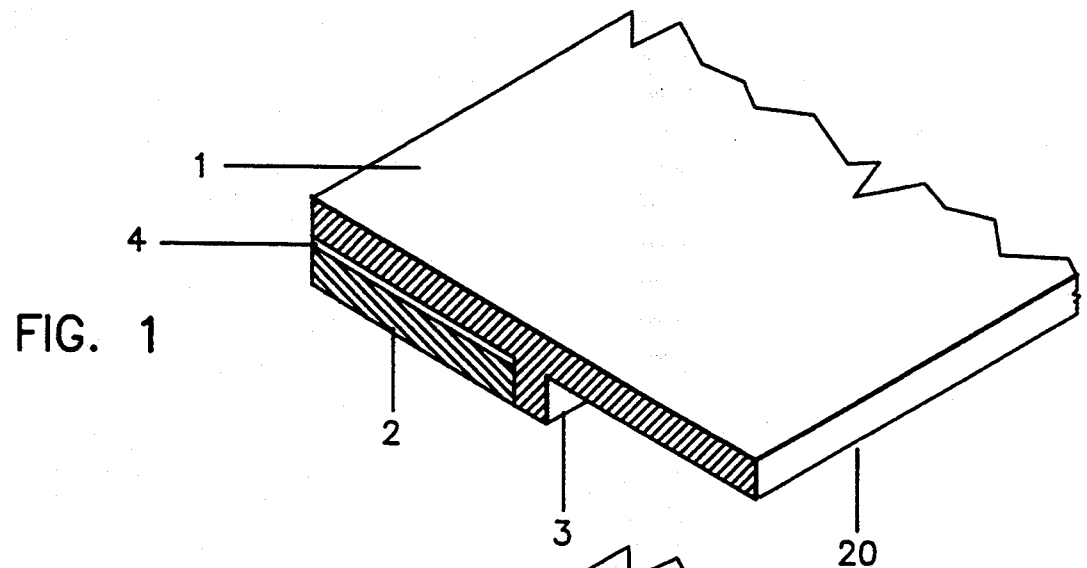
FIG. 1 is a cross-sectional view of a portion of magnetically attachable flashing according to the present invention implemented as a laminated composite material.

Reference numbers refer to the same or equivalent parts of the present invention throughout the several figures of the drawing.

BEST MODE FOR CARRYING OUT THE PRESENT INVENTION

Referring to FIG. 1, a cross-section of a magnetic boot umbrella comprising a length of magnetically attachable flashing 20 according to the principles of the present invention is shown. Flashing 20 in this composite embodiment comprises a conformable, flexible flashing strip 1 having affixed thereto a flexible magnet strip 2. Magnet strip 2 is affixed to flashing strip 1 by means of adhesive 4. In one version of this embodiment, a molded ridge 3 is formed along one side of the length of flashing strip 1 to assist in assembly by aligning the magnet strip therewith. While ridge 3 is not required to implement this embodiment, its use does assist in fabrication of the magnetically attachable flashing. In the best mode for carrying out the present invention, flexible flashing strip 1 is composed of a flexible plastic strip. Alternatively, a flexible rubber or metal strip could with equal facility be implemented. As a further alternative, flashing strip 1 may be formed of a substantially rigid plastic, metal, rubber, or fiberglass material.

Figure 2:
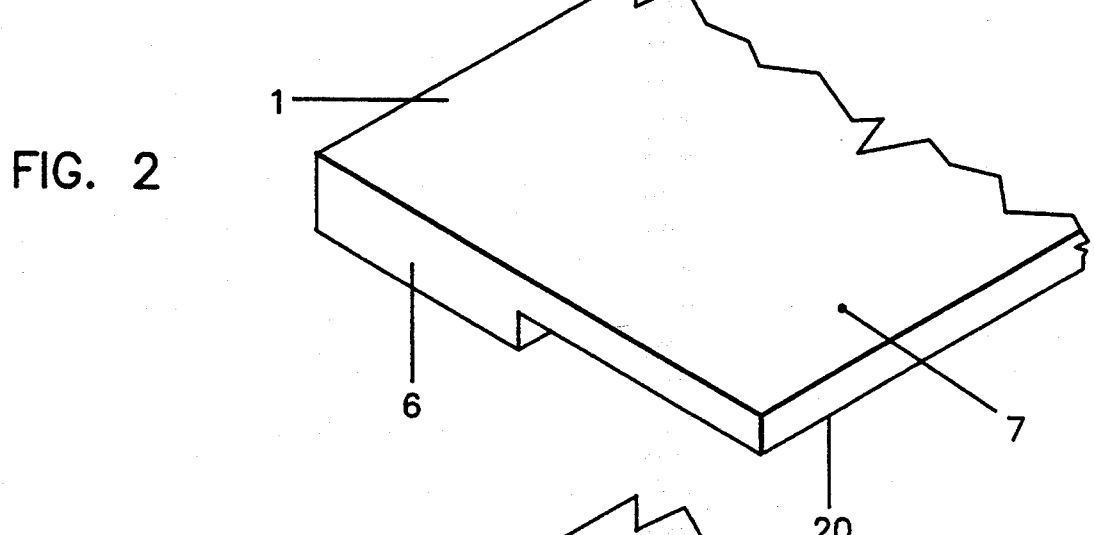
FIG. 2 is a cross-sectional representation of a section of magnetically attachable flashing according to the present invention implemented as an integral structure having a thickened magnetic attachment surface.

Referring to FIG. 2, an alternative embodiment magnetically attachable flashing strip 20 is shown. In this embodiment, the flexible magnet strip 6 is formed integrally with flashing strip 1 to provide the magnetically attachable flashing assembly 20 of the present invention. Flexible magnet strip 6 is, in this embodiment, a thickened section which allows for improved magnetic attachment to ferrous surfaces. A portion of flashing strip 1, shown hereon as 7, is substantially thinner than the flexible magnet strip section 6 to assist in conforming to the outline of the camper boot.

Figure 3:
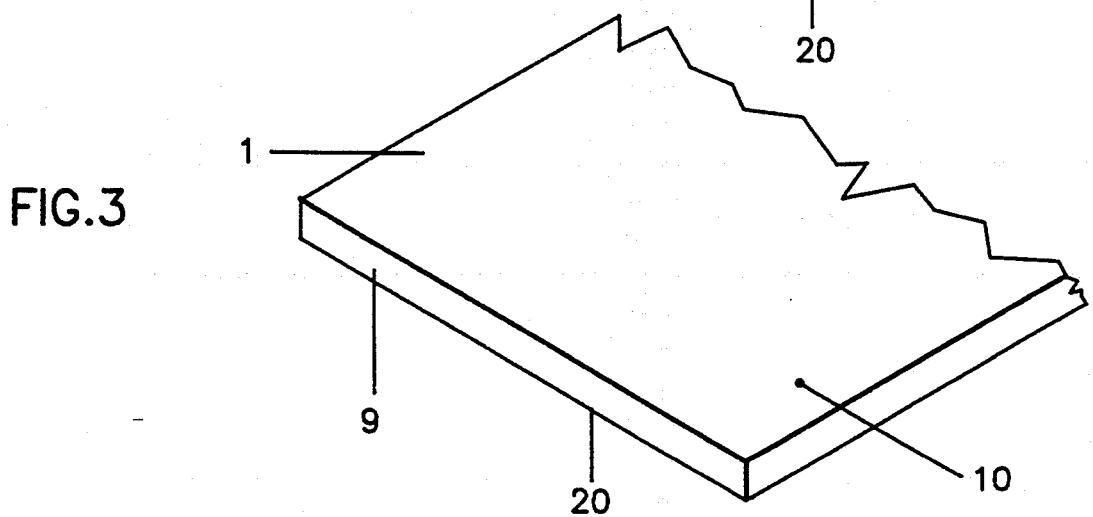
FIG. 3 is a cross-section of a portion of magnetically attachable flashing according to the present invention wherein the invention is implemented as an integral structure of uniform thickness.

With reference to FIG. 3, a second alternative embodiment of the present invention is shown. This embodiment is also an integral structure showing flexible magnet strip 9 formed integrally with a flashing section 10 to provide for magnetic attachment to the vehicle cabin. In this embodiment, flashing strip 1 is of uniform thickness and the flashing section 10 is the same thickness as the flexible magnet strip section 9.

Figure 4:
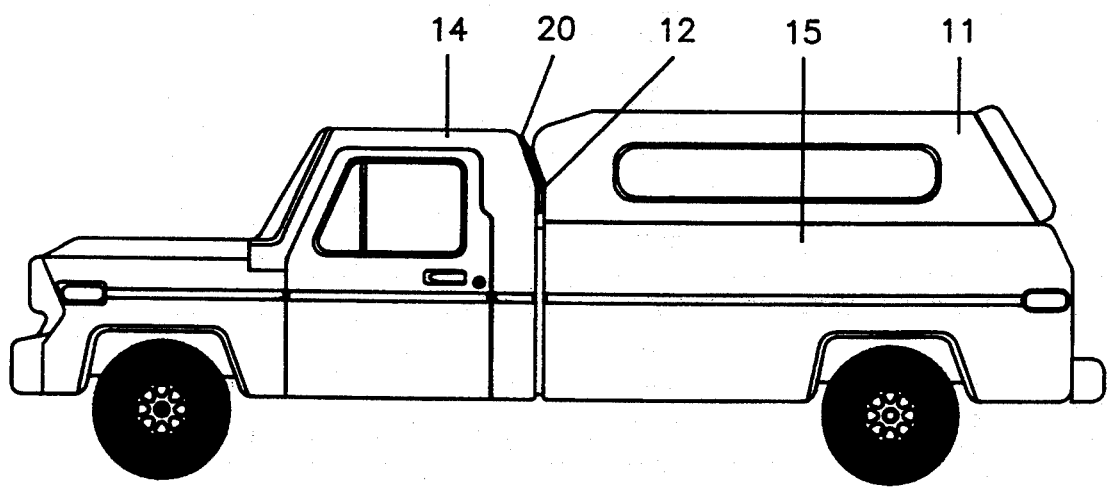
FIG. 4 is a side view of a portion of a pickup truck having a camper shell with an integral boot attached thereto the shell fitted into the bed of a pickup truck and a section of magnetically attachable flashing according to the present invention being installed on the truck.
Figure 5:
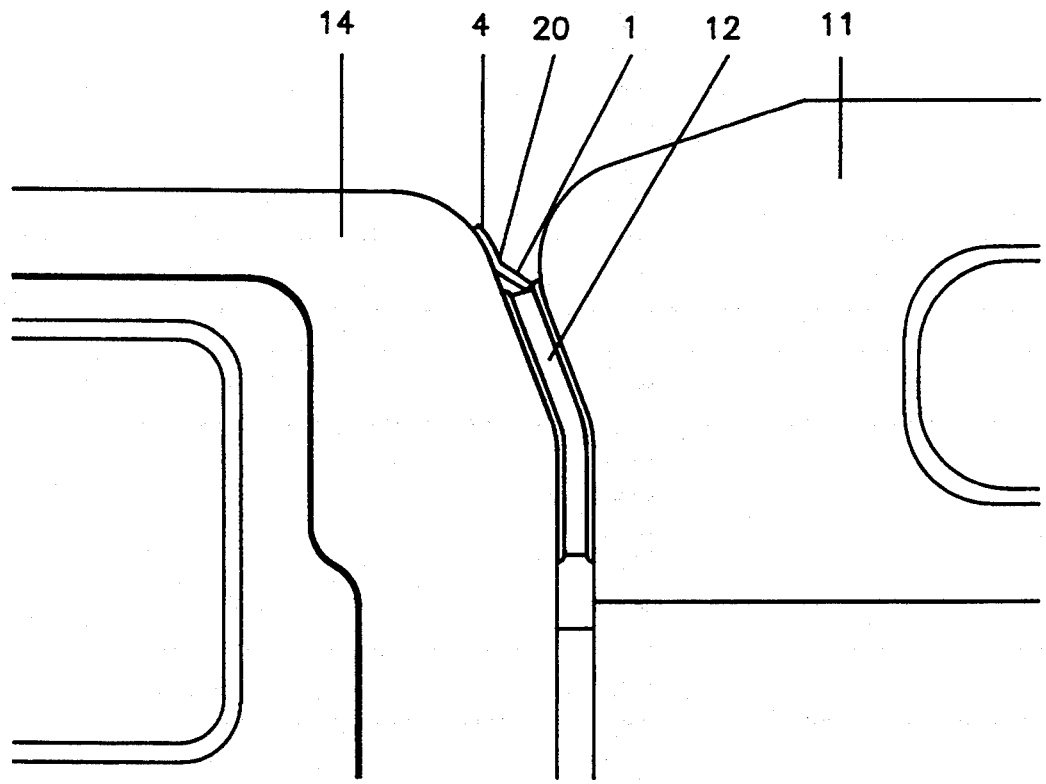
FIG. 5 is a close up side view of the magnetically attachable flashing of the present invention attached to the cabin of a truck and shielding the boot-cabin joint.

Referring to FIG. 4, a side view of an installation of a length of magnetically attachable flashing according to the present invention is shown. With reference to that figure, a pickup truck 14 has a camper shell 11 mounted in the bed 15 of the pickup truck. Camper shell 11 affixed to, and forming a part thereof, is a flexible rubber boot 12 in substantial compressive contact with the rear of the cabin of truck 14. A length of magnetically attachable flashing strip 20, as taught by the present invention, has been magnetically attached to the upper rear portion of the cabin of pickup truck 14. A detailed view of the implementation of the principles of the present invention may be seen at FIG. 5 where magnetically attachable flashing strip 20 is clearly shown affixed magnetically to the rear of truck cabin 14. Flashing strip 20 shields the joint between cabin 14 and boot 12 by overlapping boot 12. Water or other fluids are precluded from intrusion between the cabin and the magnet strip by the intimate contact therebetween afforded by the flexible and conformable nature of the strip and the tenacity of its attachment to the cabin. A fluid traveling down the rear surface of the cabin is first diverted by the magnet strip over the flashing. The flashing then diverts the fluid over the boot-cabin joint to the body of the boot and thence away.

Figures 6, 7:
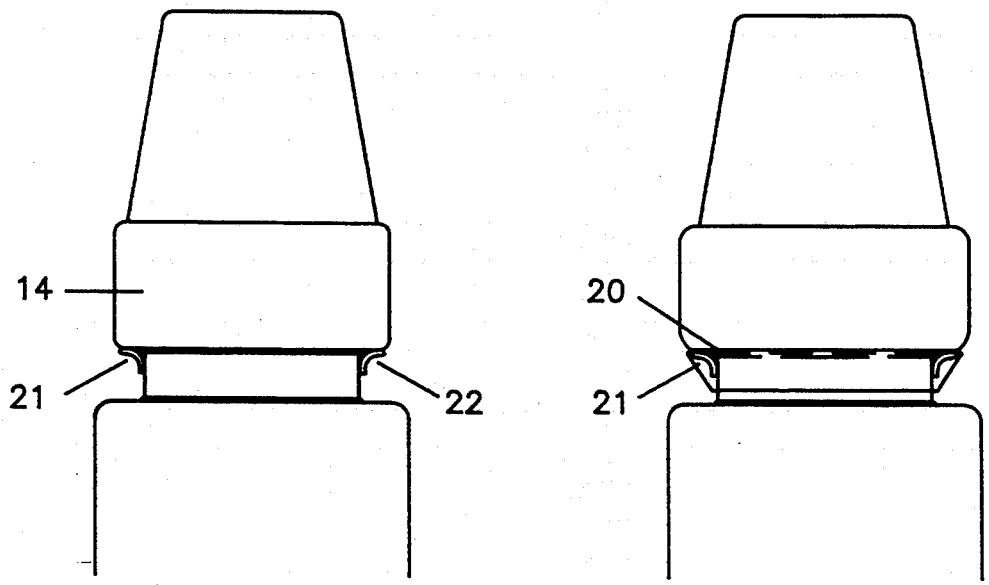
FIG. 6 is a plan view of a pickup truck having a camper shell with an integral boot attached thereto installed in the bed of a pickup truck with two sections of magnetically attachable flashing according to the present invention providing a side seal between the cabin of the vehicle and the boot of the camper shell.
FIG. 7 is an overhead representation of a pickup truck having a camper shell mounted in the bed thereof with a third section of magnetically attachable flashing according to the present invention and providing the top seal between the cabin of the vehicle and the boot seal of the camper.

Magnetically attachable flashing strip 20 typically covers the top and sides of the camper boot sealing surfaces. Magnetically attachable flashing strip 20 may be implemented as either a single formed unit or as overlapping strips. The implementation of the present invention wherein the magnetically attachable flashing strip is formed as a plurality of flashing strips is shown as FIGS. 6 and 7. In this implementation a pair of short magnetically attachable flashing strips 21 and 22 are affixed to the left and right rear sides of cabin 14 in substantial vertical alignment and substantially shield the side of the cabin-to-boot joint. After strips 21 and 22 are magnetically attached to cabin 14, strip 20, as previously shown in FIG. 4, is attached magnetically to cabin 14 substantially over the top portion of boot 12 and the upper ends of strips 21 and 22, in substantially horizontal alignment.

Figure 8:
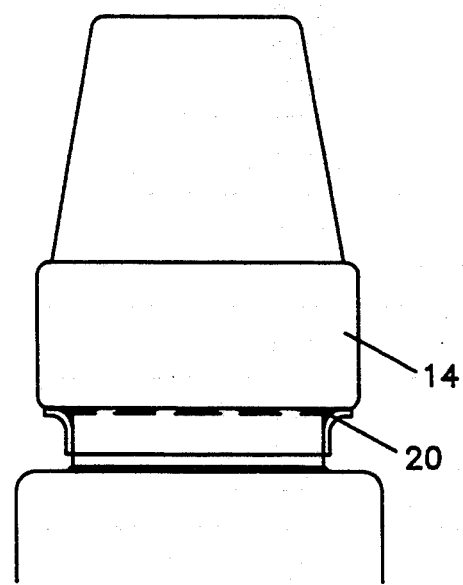
FIG. 8 is a plan view of a magnetically attachable flashing unit according to the present invention, implemented as a single formed unit.

The single formed unit implementation of the present invention is shown at FIG. 8. In this implementation, magnetically attachable flashing strip 20 is preformed into an arcuate shape 24 thereby defining a single formed unit.

Referring to FIG. 9, the flexible magnet strip of the present invention is shown attached to the camper boot itself. This embodiment contemplates affixing the flashing strip to the boot, the magnet strip then being magnetically attachable to the cabin of the truck, and thereby perfecting the seal between the boot and the cabin. Alternatively, this embodiment may be effected during manufacture of the boot.

While the color of the magnetically attachable flashing of the present invention is not necessarily a factor in it's functionality, such coloration may be important from an aesthetic sense in that a user may prefer that the flashing approximate in color at least one of the truck or the camper. Accordingly, the present invention contemplates fabrication from a material tinted to approximate such colors.

The present invention has been particularly shown and described with respect to certain preferred embodiments and features thereof. However, it will be readily apparent to those of ordinary skill in the art that various changes and modifications in form and detail may be made without departing from the spirit and scope of the invention as set forth in the appended claims. Most particularly, it will be readily apparent to those skilled in the art that variations in materials for forming the flashing strip, as well cross-sectional representations of the flashing strip not discussed herein may be employed without departing from the invention as disclosed herein.

It will further apparent to those skilled in the art that the principles of the present invention may, with equal facility, be implemented in a wide variety of applications wherever fluids need to be diverted or directed away from a surface, seal, joint, or other area needing protection, and where at least one of these surfaces is a ferrous or other magnetic material. The present invention specifically contemplates such applications.

I claim:

1. Apparatus for preventing leakage between the cabin of a truck and the existing boot of a camper in operative combination with said truck, said boot and said cabin forming a joint therebetween, said apparatus comprising magnetically attachable flashing for attachment to said cabin in proximity to said joint, for overlaying at least a portion of said joint, and for diverting the flow of fluids from said joint to the body of said boot and thence away.

2. The apparatus of claim 1 wherein said magnetically attachable flashing further comprises:
   a magnet strip for magnetic attachment to said truck cabin; and
   a flashing strip in operative combination with said magnet strip.

3. The apparatus of claim 2 wherein said apparatus is a composite structure, said composite structure further comprising an adhesive for attaching said magnet strip to said flashing strip.

4. The apparatus of claim 3 wherein said flashing strip further comprises a ridge for aligning said magnet strip.

5. The apparatus of claim 2 wherein said magnet strip is integrally formed with said flashing strip.

6. The apparatus of claim 5 wherein said magnet strip is a substantially thickened portion with respect to said flashing strip.

7. The apparatus of claim 5 wherein said magnet strip is substantially the same thickness as said flashing strip.

8. The apparatus of claim 2 wherein said flashing strip is substantially flexible and conformable.

9. The apparatus of claim 8 wherein said flashing strip is fabricated from a material selected from the group consisting of: rubber, plastic, and metal.

10. The apparatus of claim 2 wherein said flashing strip is substantially rigid.

11. The apparatus of claim 10 wherein said flashing strip is fabricated from a material selected from the group consisting of: rubber, plastic, glass-reinforced plastic, and metal.

12. The apparatus of claim 2 further comprising a plurality of magnetically attachable flashings.

13. The apparatus of claim 2 wherein said magnetically attachable flashing is a formed assembly, formed to be conformable with at least one of said cabin and said boot.

14. The apparatus of claim 2 wherein said apparatus is colored to match the color of at least one of said cabin and said camper.

15. Apparatus for preventing leakage between the cabin of a truck and the boot of a camper in operative combination with said truck, said boot and said cabin forming a joint therebetween, said apparatus defining a magnetically attachable flashing unit for attachment to said cabin in proximity to said joint, for overlaying at least a portion of said joint, and for diverting the flow of fluids from said joint, said magnetically attachable flashing unit comprising:
   a flexible and conformable magnet strip for said attachment to said truck cabin; and
   a flexible and conformable plastic flashing strip in operative combination with said magnet strip, said flashing strip defining thereon a longitudinal ridge for aligning said magnet strip with respect to said flashing strip; and an adhesive for attaching said magnet strip to said flashing strip in substantial alignment with said ridge.

16. A method for preventing leakage between the cabin of a truck and the existing boot of a camper in operative combination with said truck, said boot and said cabin forming a joint therebetween, the method comprising the steps of:

forming a flashing strip;

disposing a magnet strip upon said flashing strip;

magnetically attaching said magnet strip to said cabin of said truck in proximity to said joint, in such manner as said flashing strip overlays and shields at least a portion of said joint; and diverts the flow of fluids from said joint to the body of said boot and thence away.

17. A method for preventing leakage between the cabin of a truck and the boot of a camper in operative combination with said truck, said boot and said cabin forming a joint therebetween, the method comprising the steps of:

forming a flexible and conformable magnet strip;

forming a flexible and conformable plastic flashing strip, said flashing strip defining thereon a longitudinal ridge for aligning said magnet strip with respect to said flashing strip;

disposing an adhesive on a longitudinal portion of said flashing strip;

disposing said magnet strip on said flashing strip, in substantial alignment with said longitudinal ridge, and adhered to said flashing strip with said adhesive, said magnet strip, said flashing strip and said adhesive defining a magnetically attachable flashing unit for attachment to said cabin in proximity to said joint; and magnetically attaching said magnetically attachable flashing unit by said magnet strip to said cabin of said truck in proximity to said joint, in such manner as said flashing strip overlays and shields at least a portion of said joint, and diverts the flow of fluids from said joint to the body of said boot and thence away.

* * * * *